July 13, 1943.  R. R. CAMPBELL  2,323,975

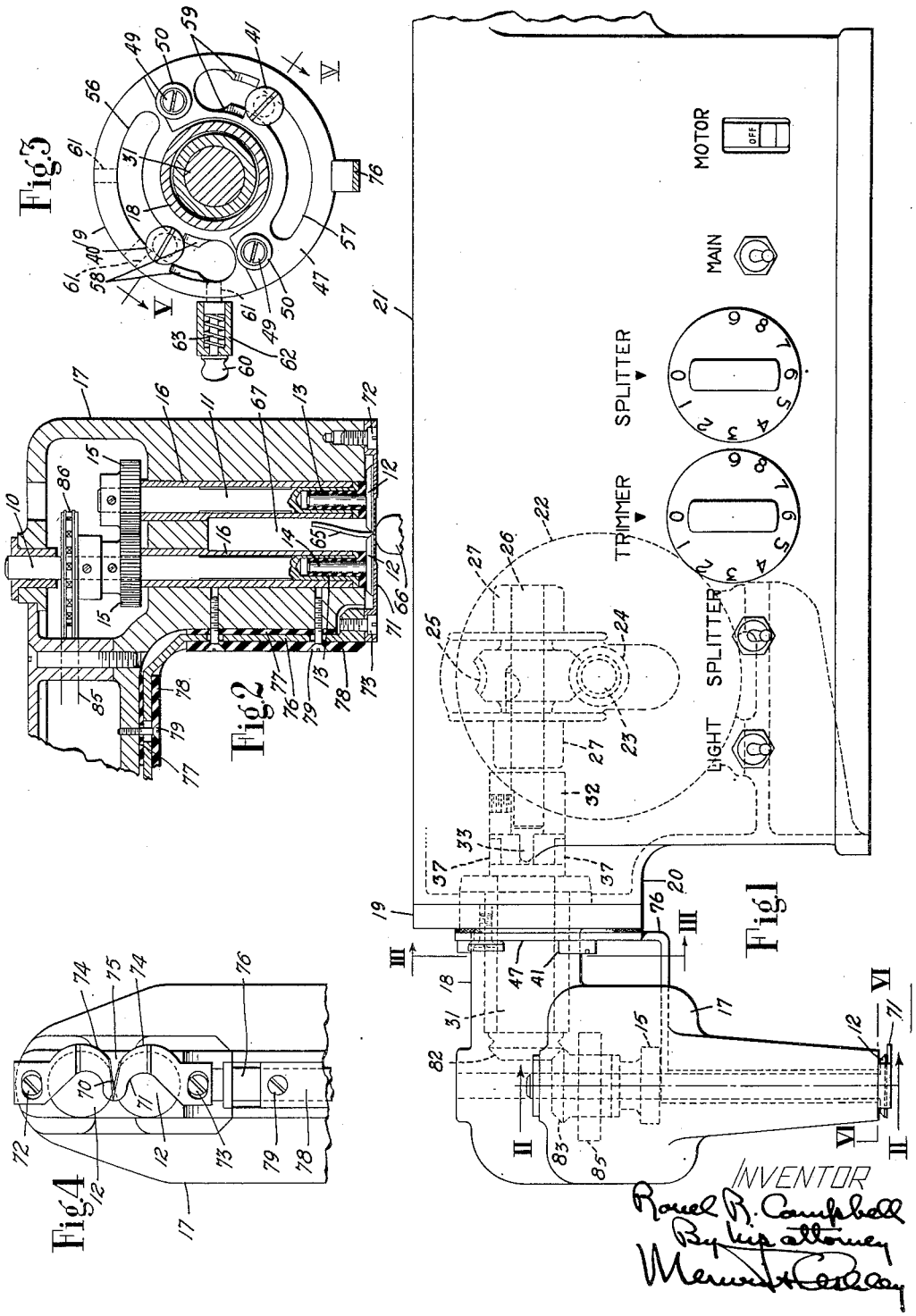

MACHINE FOR SEVERING RUBBER

Filed May 8, 1942  2 Sheets-Sheet 2

INVENTOR
Rowell R. Campbell
By his attorney

Patented July 13, 1943

2,323,975

UNITED STATES PATENT OFFICE 2,323,975

MACHINE FOR SEVERING RUBBER

Rouel R. Campbell, Lynn, Mass., assignor to United Shoe Machinery Corporation, Flemington, N. J., a corporation of New Jersey Application May 8, 1942, Serial No. 442,215

15 Claims. (Cl. 164—39)

The purpose of the present invention is to provide improvements in machines for severing thin, soft rubber in sheet form. The accompanying drawings illustrate the improvements as embodied in a machine intended to sever flash that projects from molded rubber articles, the flash being a common example of rubber in sheet form.

One of the improvements provided by the invention consists in a novel combination including a cutting blade and a pair of feed-rolls so related as to minimize the cutting duty of the blade. That is to say, the feed-rolls, though not used to do any of the actual cutting, are so situated as to reduce the thickness of the rubber at a point where the cutting edge of the blade intersects the rubber. The peripheral surfaces of the feed-rolls are arranged to pinch, squeeze or compress the rubber that travels between them, with the result that a considerable proportion of the normal quantity of rubber corresponding to the normal thickness thereof, is diverted laterally from its normal path of travel to a path of less resistance. The cutting edge of the blade is arranged to intersect the rubber at a point contiguous to the nip of the rolls where the thickness of the rubber is reduced to its least dimension by the rolls. This feature alone facilitates the severing of the rubber, but the severing is otherwise facilitated by heating the cutting blade to a high temperature. For the latter purpose the blade is made of metal that has high electrical resistance and is included in an electrical heating circuit.

Another improvement consists in a novel mounting of an assemblage comprising the trimming blade, the feed-rolls, a housing and transmission means by which rotation is transmitted to the feed-rolls. The transmission means includes a horizontal driven shaft, and the mounting of the assemblage provides for adjusting the latter about the axis of the horizontal shaft to place the trimming blade and the feed-rolls in various positions for operation, according to the characteristics of the work or the preference of the operative.

The feature last mentioned provides the basis for another improvement which consists in a novel combination in which binding posts mounted in the frame of the machine serve not only to conduct the electric current for heating the blade but also cooperate with the housing of the adjustable assemblage to provide a form of bayonet joint by which the housing and the frame of the machine may be quickly coupled and uncoupled.

Referring to the accompanying drawings,

Fig. 1 is a front elevation of a trimming machine embodying the invention;

Fig. 2 is a sectional view (see line II—II in Fig. 1) including the trimming blade, the feed-rolls and a portion of the housing by which they are carried;

Fig. 3 is an elevation partly in section of the structure indicated by line III—III in Fig. 1;

Fig. 4 is a front elevation of a portion of the trimming head turned up 90° from the position represented in Fig. 1;

Figure 5A:
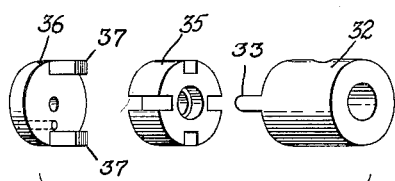
Fig. 5A is a perspective view of the parts of an Oldham coupling included in Fig. 5.

Referring to Fig. 2, two parallel shafts 10 and 11 are provided with cooperative feeding rolls 12, the perimeters of which are circular and thin. The back faces of the rolls are beveled to produce profiles or sections represented on a large scale in Fig. 7. The rolls are electrically insulated from their shafts and for this purpose the ends of the shafts are bored to provide sockets in which bushings 13 of insulating material are tightly pressed. Each feed roll is provided with an integral stem 14 and the stems are tightly pressed into the bushings 13. The shaft 10 is driven by means hereinafter described and the rotation of this shaft is transmitted to the shaft 11 by spur gears 15. The shafts 10 and 11 are journaled in bearing sleeves 16 maintained a fixed distance apart and both pressed tightly into sockets bored in a hollow arm or housing 17 preferably made of bronze.

The butt or shank of the housing 17 is in the form of a hub 18 (Figs. 1 and 5) and has a flat, circular flange 19 by which it may be coupled to a hollow cylindrical boss 20 formed on the main frame 21 of the machine. The frame 21 is a hollow casing and encloses numerous electrical units including an electric motor 22 for driving the feed rolls. The armature shaft 23 of the motor is provided with a worm 24 by which rotation is transmitted at reduced speed to a worm wheel 25 keyed to a countershaft 26. This shaft is journaled in bearings 27 inside the frame or casing 21 and is located in axial alignment with the cylindrical boss 20.

Figure 5:
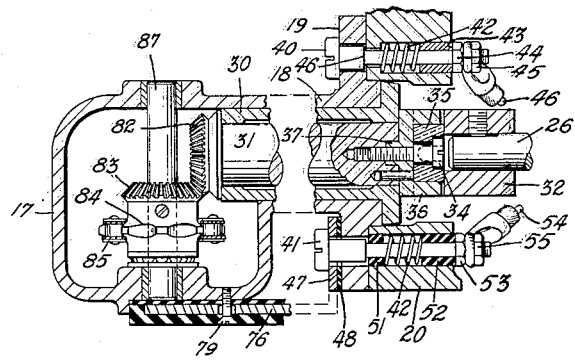
Fig. 5 is a sectional view partly in the plane of line V—V in Fig. 3 and partly in a horizontal plane and including the coupling portions of the frame and the trimming head.

Referring to Fig. 5, the shank 18 of the housing is provided with a bearing sleeve 30 in which a stub shaft 31 is journaled to transmit rotation from the counter shaft 26 to a train of gearing enclosed in the housing 17. The connection between the shafts includes coupling members (see Fig. 5A) that provide for detaching the housing 17 from the frame 21. One of the coupling members is a collar 32 keyed to the counter shaft 26 to remain affixed thereto. This collar has two diametrically opposite driving lugs 33 arranged to enter notches in a block 35 secured to the shaft 31 by a screw 34 which extends also through a coupling member 36. The latter is keyed to the shaft 31 and is provided with driven lugs 37 that lie in two other notches in the block 35. When the parts are assembled the block 35 transmits rotation from the collar 32 to the member 36.

The gearing enclosed in the housing 17 for transmitting rotation to the feed rolls comprises mitre gears 82, 83 (Fig. 5), a sprocket wheel 84, a sprocket chain 85, and a driven sprocket wheel 86 affixed to the shaft 10 (Fig. 2). Again referring to Fig. 5 the mitre gear 82 is affixed to the stub shaft 31, the gear 83 is formed on or affixed to the hub of the sprocket wheel 84, the latter is secured to a shaft 87, and this shaft is journaled in bearings in the housing.

When the housing 17 is coupled to the frame 21 as shown in Figs. 3 and 5, the flange 19 is held against the boss 20 by two headed screws 40 and 41, both extending through the boss 20 and through compression springs 42 by which they are stressed to the right. The screws 40 and 41 are also electrodes in an electrical circuit by which low-voltage current is supplied to heat a blade 71 for severing the rubber. The screw 40 extends through a metal bushing 43 and its inner end is provided with a screw thread to receive an adjusting nut 44 and a binding nut 45 between which the terminal of an electric conductor 46 is clamped. The bushing 43 and the spring 42 are both located in a socket in the boss 20. The nut 44 is adjusted to maintain initial compression of the spring 42 by which a shoulder 46 of the screw 20 is held against the boss 20 when the housing 17 is detached from the main frame.

The screw 41 is electrically insulated from the housing 17 and from the main frame 21, but its head may engage a segmental contact strip 47 of bronze carried by the flange 19 and spaced therefrom by an interposed segmental strip 48 of electrical insulating material. The two strips 47 and 48 are affixed to the flange 19 by screws 49 but these screws are insulated from the contact strip 47 by countersunk bushings 50 of insulating material. The shank of the screw 41 extends through two bushings 51 and 52 of insulating material between which the compression spring 42 is arranged and maintained under initial compression by a nut 53. The terminal of an electric conductor 54 is clamped against the nut 53 by a binding nut 55.

Referring to Fig. 3 the flange 19 is provided with two segmental keyhole slots 56 and 57 to receive the coupling screws 40 and 41, the slot 57 extending also through the segmental contact strip 47 and the interposed insulating strip 48. Each of these slots has an enlargement at one end through which the heads of the coupling screws may pass. Camming surfaces 58 formed on the flange 19 are arranged to engage the under side of the head of the screw 40 when the flange is turned about its central axis, the rise of the camming surfaces being sufficient to transfer the force of the spring 42 from the shoulder 46 (Fig. 5) to the head of the screw. In like manner, camming surfaces 59 are formed on the segmental contact strip 47 to engage the head of the screw 41 and thereby transfer the load of the corresponding spring 42 to the contact strip.

The detachable trimming assemblage, when thus coupled to the frame 21, may be turned and fastened in any one of three angular positions, according to the preference of the user. As shown in Fig. 3, a locking bolt 60 is arranged to abut the perimeter of the flange 19 or to enter any one of three radial sockets 61 bored in the flange. The locking bolt is arranged to slide in a bearing member 62 formed on or affixed to the frame 21 and containing a compression spring 63 by which the bolt will be projected into any one of the sockets.

To detach the housing 17 from the frame 21 the user will first retract the locking bolt 60, then turn the housing to place the enlarged ends of the keyhole slots 56 and 57 in register with the binding screws 40 and 41 and then move the housing away from the frame.

Figure 7:
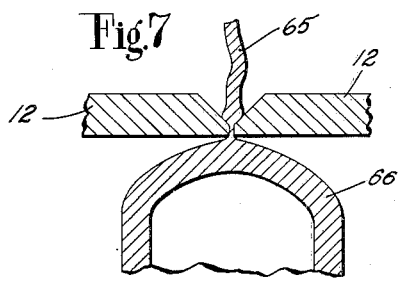
Fig. 7 is a vertical section of a work-piece and the feed-rolls in the plane of line VII—VII in Fig. 6.

When the parts are in the relation represented in Fig. 3, the shafts of the feed rolls 12 are vertical as represented in Figs. 1 and 2. This is the most desirable position of adjustment of the trimming assemblage for trimming the flash 65 from a hot-water bottle 66 made of molded rubber. For such work the user will support and manipulate the work piece to present the upper portion thereof to the feed rolls in such a way as to enable the upstanding flash to project above the feed rolls as represented in Figs. 2 and 7. On the other hand, when trimming the flash from firmer and less bulky work pieces, such as solid rubber tires for casters, it is usually preferable to turn the trimming assemblage up to the position represented in Fig. 4 in which the axes of the feed roll are horizontal. In either case the flash may travel through an open throat 67 between the bearing sleeves 16.

Referring to Fig. 7, the perimeters of the feed rolls 12 are separated by a gap much narrower than the normal thickness of the flash 65 and the latter is therefore compelled to undergo a considerable reduction in thickness at the nip of the rolls. While the flash is thus reduced in thickness it encounters the cutting edge 70 of a thin flexible blade 71, preferably of the configuration illustrated in Fig. 4. The cutting blade is omitted from Fig. 7 to avoid obscuring the compressing effect of the feed-rolls on the root of the flash 65, but it is to be understood that the location of the blade is in the narrow gaps between the feed rolls and the body 66 of the work piece. The blade is made of metal having a high degree of electrical resistance and its ends are secured by anchoring screws 72 and 73 both of which are electrodes in the heating circuit. The cutting edge 70 is on the back face of the blade which lies in contact with the front faces of the rolls. Furthermore, the cutting edge 70 is contiguous to the nip of the rolls where the material to be severed is reduced in thickness and under considerable stress by reason of being compressed.

The portions 74 (Fig. 4) of the blade are formed and arranged to mask the margins of the segments of the feed rolls that move toward each other. Consequently, they constitute a guard to fend the body of a work-piece from the nip of the rolls. In a blade of this type a V-shaped notch 75 is formed between the masking portions 74 to receive the flash, and the cutting edge is produced by beveling the front face of the blade along both boundaries of the notch. These beveled faces, when traversed by the molded body of the work, have a slight camming effect which presses the blade against the front faces of the feed rolls and thereby maintains the cutting edge at a point where the material to be severed is compressed to its thinnest dimension. Moreover, the blade is reduced to a narrow width in the plane of the path of the work to enable incurved boundaries of molded bodies to go behind the back edge without diverting the root of the flash from the cutting edge.

Figure 8:
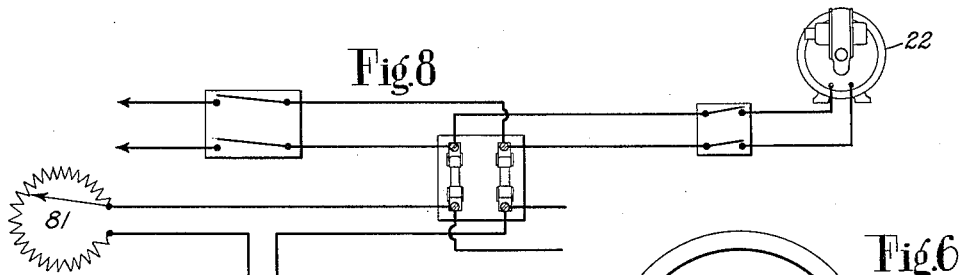
Fig. 8 represents a wiring diagram of the electrical elements.
Figure 6:
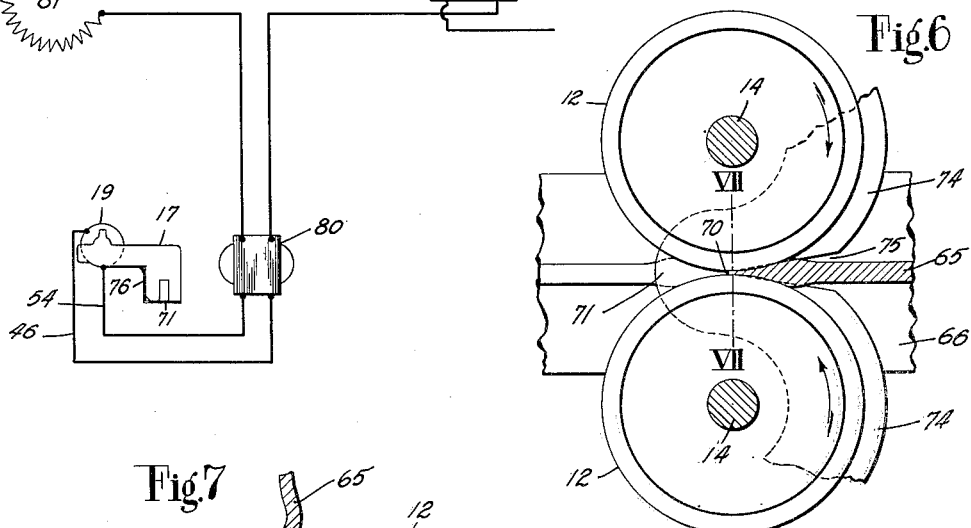
Fig. 6 is a horizontal section (enlarged scale) in the plane of line VI—VI in Fig. 1.

The anchoring screw 72 binds the blade against the housing 17 which serves as a ground connection in the heating circuit, but the anchoring screw 73 binds the blade to a conductor 76 electrically insulated from the housing 17 and located between strips 77 and 78 of insulating material. The strips 77 and 78 and the conductor 76 are secured to the housing 17 by screws 79. One end of the conductor 76 is welded to the contact strip 47 (Fig. 3) to provide electrical connection therewith. As shown in the wiring diagram (Fig. 8) the blade 71 is in the secondary circuit of a transformer 80, the primary circuit of which includes a rheostat 81. The secondary circuit may be traced as follows: from the secondary winding of the transformer through wire 54, binding screw 41, contact strip 47, conductor 76, blade 71, housing 17, binding screw 40, wire 46 and thence to secondary winding.

In practice the temperature of the blade 71 may be regulated by the rheostat 81. To obtain the best results the blade should be hot enough to melt the rubber, but the rate at which the work is fed by the rolls 12 restricts the melting effect to the rubber actually severed by the blade. Some grades or types of rubber may be broken down at a temperature of 300° F. but other grades require higher temperatures of the blade. Since the rolls 12 absorb some heat from the blade 71 the bushings 13 are made of material that has low heat conductivity. If a molded work-piece is maintained manually against the front face of the blade with slight pressure as the trimming progresses the narrow remnant of flash left on it at the cutting point will be melted down as it traverses the blade from the cutting point to the back edge of the blade.

Having described my invention, what I claim as new and desire to secure by Letters Patent of the United States is:

1. A trimming machine comprising a fixed blade having a beveled front face to be engaged by a molded rubber body and having a cutting edge on its back face, a pair of feed rolls having thin perimeters arranged to grip the root portion of unsevered flash projecting from the rubber body in advance of said cutting edge, and rigidly related bearings by which the feed rolls are constrained to reduce the thickness of the unsevered flash at the point of cutting.

2. A trimming machine comprising two spaced anchoring members, a blade secured by them and having a thin, flexible portion between them, one face of said flexible portion being beveled and arranged to be engaged by a molded rubber body and the opposite face having a cutting edge, a pair of feed rolls having front faces in contact with said opposite face of the blade, the feed rolls also having thin perimeters arranged to grip the root of unsevered flash projecting from the molded body in advance of said cutting edge, and means by which the feed rolls are constrained to reduce the thickness of the unsevered flash at the cutting point.

3. A trimming machine comprising a fixed blade having a beveled front face to be engaged by a molded rubber body and having a cutting edge on its back face, and power-driven work-feeding means including a pair of feed rolls having front faces in contact with the back face of said blade and having perimeters arranged to grip the root portion of flash projecting from the molded body, the portions of the blade confronting said rolls being formed to mask the segments moving toward each other but having a notch to receive the flash.

4. A trimming machine comprising an electrical heating circuit including a pair of electrodes and a blade of high-resistance metal connecting them, said blade having a front face arranged to be engaged by a molded rubber body, a pair of electrically insulated feed rolls having front faces in contact with the back face of said blade between said electrodes, said rolls also having perimeters arranged to grip flash projecting from the molded body, and means by which said rolls are constrained to reduce the thickness of the flash between them, the blade having a cutting edge arranged to intersect the flash at a point where its thickness is reduced by said rolls.

5. A cutting machine comprising a pair of feed rolls the perimeters of which are arranged to grip and feed sheet rubber, rigid means by which the rolls are positively constrained to reduce the thickness of the rubber between them, a blade of metal having a cutting edge arranged to intersect the rubber at a point where its thickness is reduced by said rolls, means by which said blade is heated to a rubber-melting temperature, and means for driving said rolls.

6. A trimming machine comprising a pair of feed rolls having thin perimeters arranged to grip the root portion of flash projecting from a molded rubber body, means by which said rolls are constrained to reduce the thickness of the material between them, a fixed blade having a cutting edge arranged to intersect the root of the flash at a point where its thickness is reduced by said rolls, means for heating said blade, and means for driving said rolls.

7. A machine for severing rubber flash comprising an electrical circuit including a thin blade of resistance metal to be heated by current conducted thereby, the blade having a cutting edge, a pair of power-driven feed-rolls arranged to grip the root of unsevered flash projecting from a molded rubber work-piece at a point adjacent to the line of junction therewith, and stationary supporting means by which said blade is maintained in a position to be traversed by the molded body of the work-piece and by which the cutting edge of the blade is maintained in a position to sever the flash along said line.

8. A trimming machine comprising an electrical heating circuit including a blade of high resistance metal having a cutting edge forming a V-notch, stationary means by which said blade is held, a pair of electrically insulated feed-rolls arranged to feed sheet material into said notch, the nip of said rolls being contiguous to the crotch of said notch, and means for driving said rolls.

9. A trimming machine comprising a pair of feed-rolls arranged to grip the flash projecting from a molded rubber work-piece, means for driving said rolls, and a trimming blade having a cutting edge arranged to intersect the flash at a point adjacent to the nip of the feed-rolls, the blade also having portions arranged to mask the margins of the segments of the feed-rolls that move toward each other.

10. A trimming machine comprising a pair of electrically insulated feed-rolls arranged to grip the flash projecting from a molded rubber work-piece, means for driving said rolls, and an electrical heating circuit including a pair of stationary electrodes located adjacent to said rolls and connected by a thin, flexible blade of high resistance metal extending across the ends of said rolls, the blade having a cutting edge contiguous to the nip of the rolls.

11. A trimming machine comprising an electrical circuit including a blade of high-resistance metal, stationary supporting means to which the blade is fastened, a pair of feed rolls, and means for driving said rolls, said blade having a cutting edge abreast of and contiguous to the nip of said rolls.

12. A trimming machine comprising a frame, a trimming head, a blade of electrical resistance metal affixed to the head and having a cutting edge, means arranged on said frame for supplying heating current, and conductors arranged to form a circuit including said means and said blade, said conductors including cooperative coupling members arranged to couple the trimming head and said frame in cooperative relation.

13. A trimming machine as defined in claim 12 in which said coupling members are formed and arranged to provide for angular adjustment of the trimming head within their coupling range and in which the cutting edge of said blade is arranged to lie alternatively in a horizontal plane and in a vertical plane within the range of such adjustment.

14. A trimming machine comprising a frame, a trimming head, cooperative coupling members carried respectively by said frame and the head and arranged to be interlocked by turning the head about a horizontal axis, a trimming cutter carried by the head, means carried by the head for feeding the work past said cutter, and driving means mounted on said frame, said feeding means and said driving means including cooperative coupling members arranged to rotate about said axis and to be coupled and uncoupled by relative movement along said axis.

15. A trimming machine comprising a pair of feed rolls having perimeters arranged to grip and compress the root of unsevered flash projecting from a molded rubber body, means for driving said rolls, a blade arranged to be engaged by the rubber body adjacent to the root of the flash, the blade having a cutting edge arranged to sever the compressed root abreast of the nip of the rolls, and means for heating the blade.

ROUEL R. CAMPBELL.